United States Patent
Dachs

(10) Patent No.: US 10,155,335 B2
(45) Date of Patent: Dec. 18, 2018

(54) METHOD AND DEVICE FOR FORMING PLASTIC PREFORMS WITH CROSS-SECTION CHANGE OF A VOLUME FLOW

(71) Applicant: KRONES AG, Neutraubling (DE)

(72) Inventor: Alexander Dachs, Neutraubling (DE)

(73) Assignee: KRONES AG (DE)

( * ) Notice: Subject to any disclaimer, the term of this patent is extended or adjusted under 35 U.S.C. 154(b) by 329 days.

(21) Appl. No.: 14/925,785

(22) Filed: Oct. 28, 2015

(65) Prior Publication Data
US 2016/0114519 A1    Apr. 28, 2016

(30) Foreign Application Priority Data

Oct. 28, 2014 (DE) .................. 10 2014 115 645

(51) Int. Cl.
*B29C 49/58* (2006.01)
*B29C 49/18* (2006.01)
(Continued)

(52) U.S. Cl.
CPC ........ *B29C 49/185* (2013.01); *B29C 49/4205* (2013.01); *B29C 49/4289* (2013.01);
(Continued)

(58) Field of Classification Search
CPC ... B29C 49/16; B29C 49/185; B29C 49/4205; B29C 49/4289; B29C 49/4284; B29C 49/06; B29C 49/78; B29C 49/36
See application file for complete search history.

(56) References Cited

U.S. PATENT DOCUMENTS

| 8,460,599 B2 | 6/2013 | Geltinger et al. ............ 264/529 |
| 2002/0011681 A1 | 1/2002 | Rose et al. ................... 264/40.1 |

(Continued)

FOREIGN PATENT DOCUMENTS

| CN | 101746051 | 6/2010 | ............ B29C 49/18 |
| DE | 198 43 053 | 9/1998 | ............ B29C 49/78 |

(Continued)

OTHER PUBLICATIONS

Detrois Christian, DE 10-2006-061301 A1, Machine Translation, Jun. 2008 (Year: 2008).*

(Continued)

*Primary Examiner* — Galen H Hauth
(74) *Attorney, Agent, or Firm* — Hayes Soloway P.C.

(57) ABSTRACT

A method for forming plastic preforms into plastic bottles, wherein the plastic preforms are transported along a predefined transport path by a transport device in a plurality of forming stations arranged on the transport device, and at least at times during the transport, bombarded with a fluid medium for their expansion, wherein the plastic preforms in a first method step are bombarded by the fluid medium at a first pressure (p1) and in a further method step, temporally following the first method step, bombarded with the fluid medium at a second pressure (p2), wherein the second pressure (p2) is higher than the first pressure (p1). At least at times during the bombardment of the plastic preforms at the first pressure (p1), a volume flow of the fluid medium entering the container is increased.

9 Claims, 7 Drawing Sheets

(51) Int. Cl.
*B29C 49/42* (2006.01)
*B29C 49/06* (2006.01)
*B29C 49/36* (2006.01)
*B29C 49/78* (2006.01)
*B29K 105/00* (2006.01)
*B29L 31/00* (2006.01)

(52) U.S. Cl.
CPC .............. *B29C 49/06* (2013.01); *B29C 49/36* (2013.01); *B29C 49/4284* (2013.01); *B29C 49/78* (2013.01); *B29K 2105/258* (2013.01); *B29L 2031/7158* (2013.01); *Y02P 70/267* (2015.11); *Y02P 70/271* (2015.11)

(56) References Cited

U.S. PATENT DOCUMENTS

| 2011/0057343 A1 | 3/2011 | Brunner et al. ............. 264/40.1 |
| 2014/0110873 A1 | 4/2014 | Asbrand et al. ............. 264/40.3 |

FOREIGN PATENT DOCUMENTS

| DE | 102 40 252 | 3/2004 | .............. F15B 11/02 |
| DE | 10 2006 061 301 | 6/2008 | .............. B29C 49/06 |
| DE | 102006061301 A1 * | 6/2008 | .............. B29C 49/42 |
| DE | 10 2007 015 105 | 10/2008 | .............. B29C 49/78 |
| DE | 10 2012 110 023 | 4/2014 | .............. B29C 49/18 |
| EP | 0 838 596 | 4/1998 | .............. F15B 13/042 |
| WO | WO 2011/154326 | 12/2011 | .............. B29C 49/12 |
| WO | WO-2011154326 A1 * | 12/2011 | .............. B29C 49/12 |

OTHER PUBLICATIONS

Chinese Office Action issued in application No. 2015107024302, dated Apr. 17, 2017 (16 pgs).
Extended European Search Report issued in European Patent Appln. No. 15191985.9-1706 dated Mar. 10, 2016 (6 pgs).
German Search report for corresponding German Patent Application Serial No. 10 2014 115 645.5, dated Aug. 21, 2015 (8 pages).

* cited by examiner

METHOD AND DEVICE FOR FORMING PLASTIC PREFORMS WITH CROSS-SECTION CHANGE OF A VOLUME FLOW

BACKGROUND OF THE INVENTION

The present invention relates to a method and a device for forming plastic preforms into plastic containers. Such methods and devices have been known for some time from the prior art. Normally, heated plastic preforms are formed into plastic containers by pressurizing with compressed air. In the prior art, usually several pressure stages are used to expand the plastic preforms. It is known firstly to carry out a pre-inflation with a low pressure and then finally inflate the plastic preforms with a higher pressure. In addition, in the prior art normally an intermediate inflation is applied, which temporally lies between the pre-inflation and the final inflation. This plurality of different pressure stages leads to a comparatively great complexity of reservoirs which are normally configured as ring channels. Also, the actual procedure for forming the plastic preforms is relatively complex. On the other hand, previously it was assumed that in particular the provision of an intermediate blowing pressure level greatly simplifies or improves the blow moulding process.

SUMMARY OF THE INVENTION

The present invention is therefore based on the object of creating a possibility which firstly reduces the great complexity of different pressure reservoirs, and secondly still leads to satisfactory blow moulding results.

In a method according to the invention for forming plastic preforms into plastic containers, and in particular plastic bottles, the plastic preforms are transported along a predefined transport path by means of a transport device in a plurality of forming stations arranged on this transport device, and at least at times during this transport, bombarded with a fluid medium for their expansion. Furthermore, the plastic preforms in a first method step are bombarded by the fluid medium at a first pressure and in a further method step, temporally following the first method step, bombarded with the fluid medium at a second pressure p2, wherein the second pressure p2 is higher than the first pressure p1.

According to the invention, at least at times during the bombardment of the plastic preforms at the first pressure, a volume flow of the fluid medium entering the container is changed and in particular increased.

It is therefore preferably proposed that no intermediate inflation occurs, but merely a (in particular temporally extended) pre-inflation or bombardment at the lower pressure p1. However during the expansion process, preferably the flow cross-section is changed and in particular increased. Thus for example it is possible that during or after the pre-inflation, an automatic program runs in which a cross-section of a valve is opened, in particular fully opened, and hence the associated pressure is substantially completely applied to the plastic preform or container. As well as the term "container", the term "vessel" is used synonymously below.

Preferably, the plastic preform is pressurized only with two different pressure levels. Thus particularly preferably, there is no need to provide a further pressure level for intermediate inflation. Preferably, bombardment at the second pressure directly follows the bombardment at the first pressure without a further intermediate pressure level.

Preferably, the plastic preforms are transported along a substantially circular transport path. Here it is possible that the transport device has a rotating wheel, such as for example a blowing wheel, on which the forming stations are arranged and with which the forming stations are moved. Preferably, the first pressure is a constant pressure, i.e. the pressure is kept constant during the first phase of the forming process, i.e. the pre-inflation. Advantageously, the second pressure is also a constant pressure, i.e. this pressure is also held constant during the second phase of the process, i.e. the final inflation.

In a further preferred method, the plastic preforms are stretched in the longitudinal direction during the forming process. Advantageously, to this end a rod-like body, such as in particular but not exclusively a stretching rod, is introduced into the plastic preforms to stretch these.

In a further preferred embodiment, the first and/or second pressures are provided by pressure reservoirs. Advantageously, these pressure reservoirs may be ring channels which are able to supply the pressurized medium to several and preferably all forming stations of the device. Advantageously, the pressure supplied to the containers is controlled by the use of valves. Thus for example valves can control both the pre-inflation pressure and the final inflation pressure.

Preferably, the second pressure is between 10 bar and 50 bar, preferably between 15 bar and 40 bar, and particularly preferably between 20 bar and 30 bar. Preferably, the first pressure is between 5 bar and 40 bar, preferably between 10 bar and 30 bar, and particularly preferably between 15 bar and 25 bar. In a further preferred method, the first and second pressures have a ratio to each other of between 1:3 and 2:3, preferably between 2:5 and 3:5. Particularly preferably, the first pressure is around half of the second pressure. Advantageously, the fluid medium with which the plastic preforms are bombarded is a gaseous medium, in particular blowing air.

It is particularly advantageous to use a proportional valve known from hydraulics, since this switches quickly and can also be configured for a high through-flow.

In an advantageous method, various monitoring functions may be provided. Thus the development of the mass flow on quality deviations at the container can be corrected if required. Thus it is possible to check the containers produced "in-line", i.e. after production but while still in the machine or plant, e.g. the wall thickness, floor mass or floor geometry of the container, in order then to make a direct adjustment of the mass flow and/or volume flow.

It is furthermore possible to measure the mass flow and/or volume flow and use this to regulate the same.

When a proportional valve is used, this can simultaneously be used to purge the container after the end of the blowing process, so no additional arrangements are required for this.

In conjunction with a further valve, the proportional valve can preferably easily be used for recycling the blowing air.

The proportional valve may be configured in various ways, e.g. with a valve slider or a valve cone. Furthermore, a structural variation may entail the slider or cone assuming its positions by fixed stops, but it may also be position-regulated. Position regulation is indeed more complex but more precise.

Throughout the description, mention is made of "control" or "regulation" of the volume flow or mass flow of the fluid. Since the mass flow is directly correlated to the volume flow via the density of the fluid, the method described may where applicable also be carried out with mass flow control instead of volume flow control.

In a further advantageous embodiment, the plastic preforms are bombarded at a first pressure during a first time period and at a second pressure during a second time period, wherein these time periods have a ratio to each other of between 1:2 and 1:20. Preferably therefore, the period over which the plastic preforms are bombarded at pressure p1 is extended compared with methods in the prior art.

In a further advantageous method, the first pressure is provided by a first pressure reservoir and at least at times, fluid medium is supplied to this first pressure reservoir from at least one forming station. It is therefore proposed here that part of the compressed air used for blowing is recycled. Since, as stated above, the final inflation pressure is substantially higher than the pre-inflation pressure, after forming of the plastic preforms it is possible to return part of this pressure back from the container to the pressure reservoir for the pre-inflation pressure.

In a further advantageous method, the supply of fluid medium to/or in the plastic preforms is controlled as a function of a peripheral position of the respective forming stations. Therefore in particular a control of the blowing process dependent on rotary angle is proposed.

As stated above, preferably a control of the flow cross-section by means of an electric valve is proposed, i.e. in particular a valve which allows an electric adjustment of the flow cross-section. The volume flow is here adjustable via a cross-section or opening cross-section of the valve. Thus after pre-inflation, an automatic program may run in which the flow cross-section is fully opened. It is possible here that an opening of this flow cross-section may be continuous, however opening with a stepped development is also conceivable. After opening of the valve, preferably the program switches to the second pressure level p2, wherein preferably the switch takes place at a threshold value. This may take place for example at a pressure level of 1 bar below the p1 pressure.

The air consumption is then theoretically slightly higher because recycling only occurs in one channel. However this difference becomes very small, the lower the higher pressure p2 becomes, because in systems known from the prior art, the pre-inflation pressure p1 and the intermediate inflation pressure Pi have approximately the same pressure level. The applicant has found that in the end, however, an improvement is to be expected.

Thanks to recent developments in purging technology however, the p2 pressure in the medium term lies in the range from 20 to 30 bar, preferably around 25 bar, which leads to the Pi pressure of intermediate inflation lying at around 12 bar, i.e. in the range of the p1 pressure level. Due to the proposed procedure, the recycling of compressed air is easier and quicker since the valve cross-section is completely open. In addition, fixed limits can be set for the control and pressure level. Previously, it was not known how much air comes from the pressure reservoir for the p1 pressure and how much air comes from the pressure reservoir for the Pi pressure. The respective process angles also shift accordingly.

Furthermore, there is one switching time delay less. A complete ring channel including valves, and also a number of parameters in a control unit such as a touchscreen, may be omitted. Because this intermediate pressure level is completely omitted, the air recycling is substantially simplified. Incorrect adjustment of the Pi system and recycling can thus be avoided.

The present invention is furthermore oriented at a device for forming plastic preforms into plastic bottles or plastic containers. This device has a movable transport device with a plurality of forming stations which are arranged on this transport device and transported thereby. Each of these forming stations has at least one bombardment device for bombarding the plastic preforms with a fluid medium. Furthermore, the device has a first compressed air reservoir which provides the fluid medium at a first pressure, and a second compressed air reservoir which provides the compressed air at a second pressure, wherein the second pressure is higher than the first pressure, and wherein the device furthermore has a control device which controls the supply of the fluid medium into the plastic preforms.

According to the invention, the device has a flow cross-section change device which at least at times allows a change of a flow cross-section of the fluid medium entering the containers. Furthermore the control device is configured such that, at least at times during the bombardment of the plastic preforms at the first pressure, a volume flow of the fluid medium entering the plastic preforms is changed and in particular increased. It is therefore also proposed in relation to the device that a flow cross-section is changed by means of a flow cross-section change device.

Advantageously, the flow cross-section change device is a proportional valve to control the supply of the fluid medium at the first pressure.

In a further advantageous embodiment, the device has at least one connecting line, by means of which the fluid medium can be conducted from at least one forming station to the first reservoir. Thus here again, a line connection is proposed which allows recycling of blowing air. Advantageously, a cross-section change device is arranged in a connecting line between said forming station and at least one compressed air reservoir, which allows a change of volume flow or mass flow of the fluid medium entering the reservoir from the forming station.

In a further advantageous embodiment, the device comprises at least one measurement device for determining a volume flow of the fluid medium. Thus it is possible that the flow cross-section of the fluid medium entering the plastic preforms is controlled as a function of data emitted by this measurement device.

Preferably, the two compressed air reservoirs are fed from a compressed air generator device such as a compressor. In a further advantageous embodiment, the compressed air reservoirs are formed as ring channels which supply all forming stations with compressed air.

DETAILED DESCRIPTION OF THE INVENTION

Figure 1:
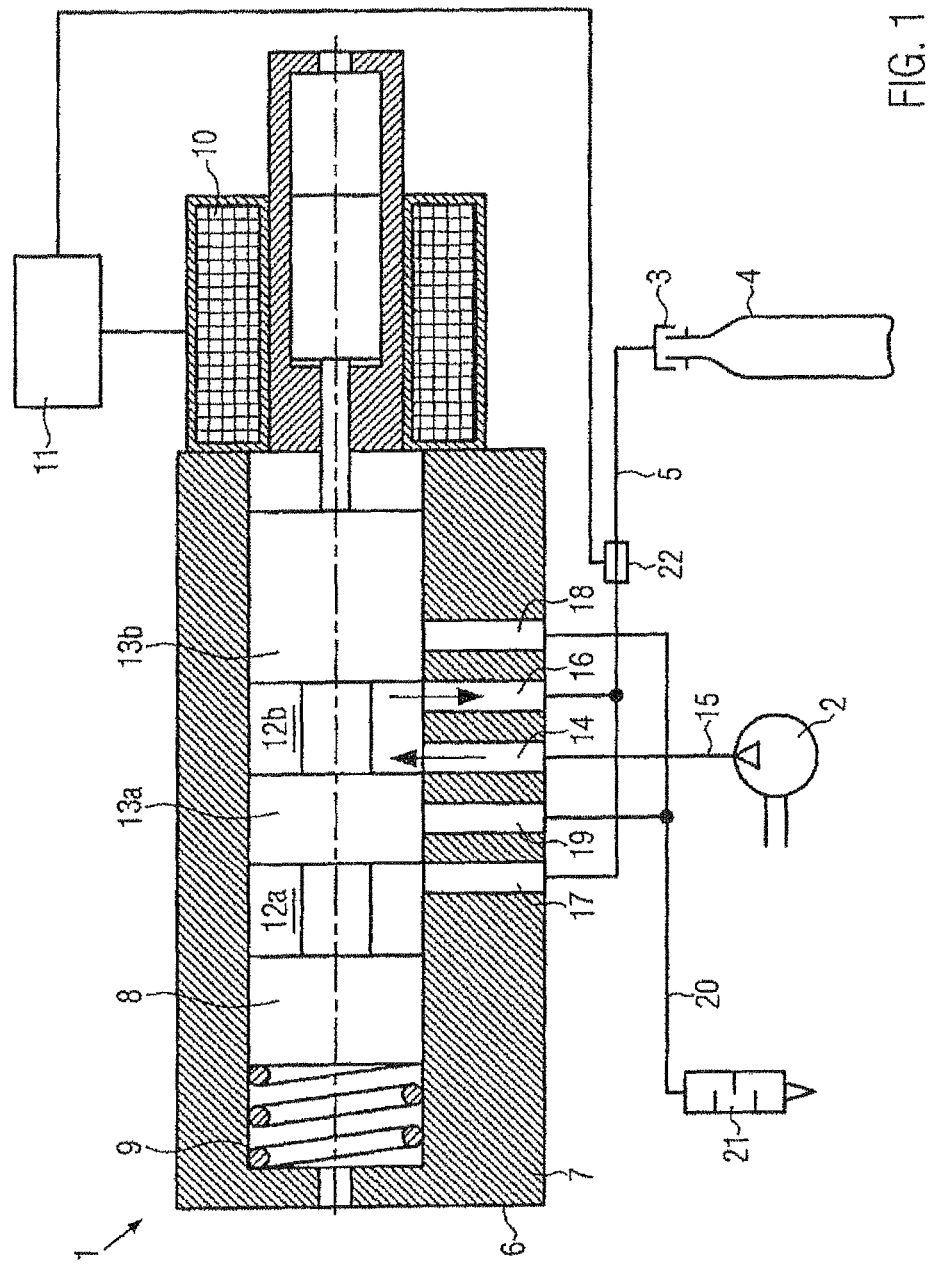
FIG. 1 shows a first exemplary embodiment of a device suitable for performance of the method according to the invention, in diagrammatic part view, on aeration of a container.
Figure 2:
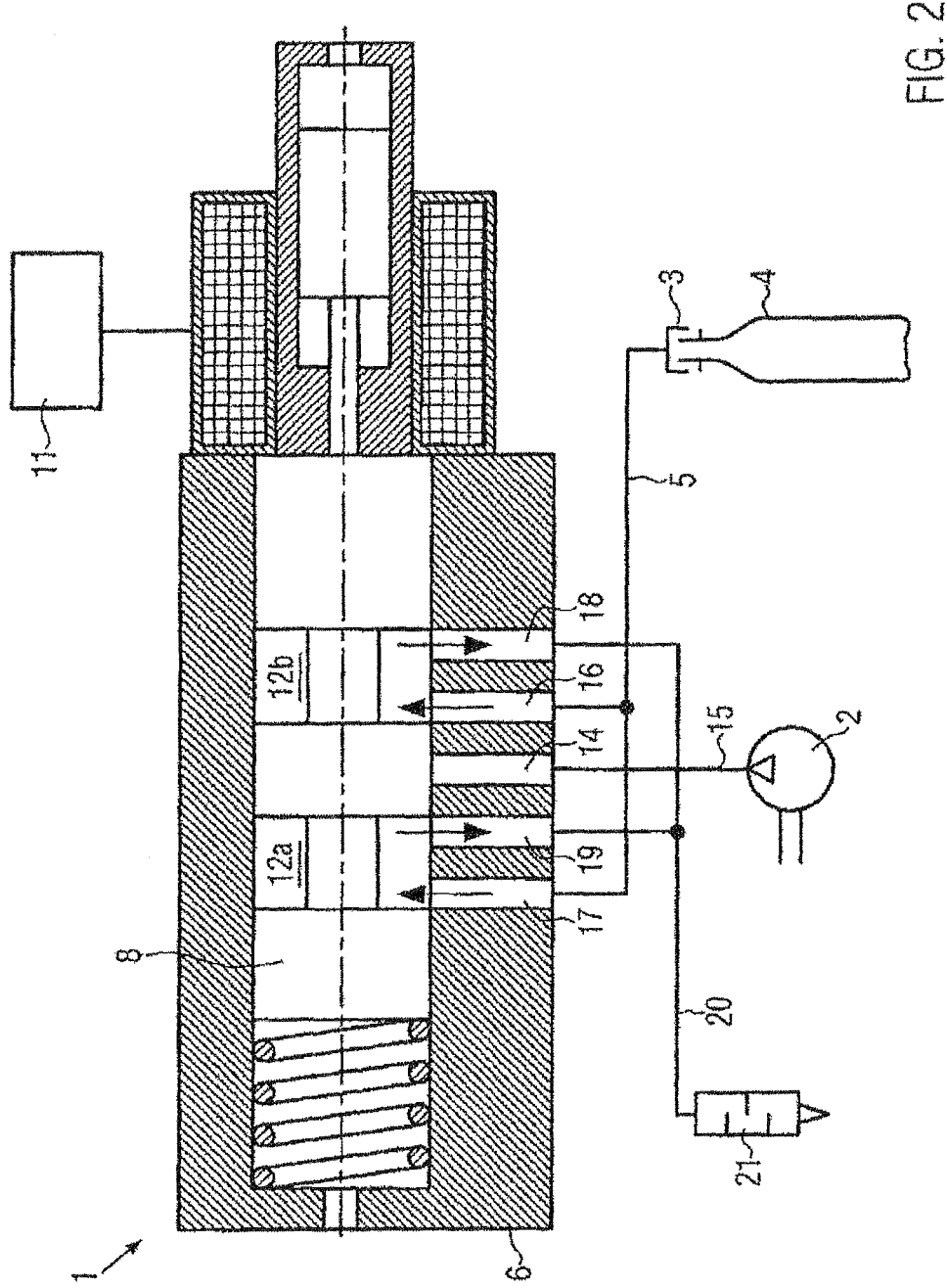
FIG. 2 shows the device from FIG. 1 on venting of a container.

FIGS. 1 and 2 show a first exemplary embodiment of a device 1 for performance of a blow moulding method. The device 1 is highly diagrammatic and restricted to the components necessary to explain the invention. The device 1 may be part of any known container production machine, in particular a blow moulding machine, in particular a stretch-blow moulding machine.

The device 1 contains a compressed air source 2 which is preferably configured as or connected to a single- or multi-stage compressor. The compressed air source 2 is able to provide compressed air from 0 to 40 bar, preferably up to 50 bar.

In addition, the device has two compressed air reservoirs (not shown in FIG. 1) which can be fed from one or more compressed air sources. The two compressed air reservoirs serve to provide blowing air at two different pressures p1 and p2. In contrast to the depiction in FIG. 1, these compressed air reservoirs may be fed from the compressed air source 2 or a plurality of compressed air sources. It would be possible for the arrangement shown in FIG. 1 to be provided for several compressed air reservoirs. Also, preferably, the bombardment device 3 has a valve block which controls the supply of blowing air into the container at different pressures.

The device 1 furthermore contains a conventional blow mould which is not shown here. A preform made of plastic, in particular PET, of the conventional type is placed in the blow mould and removed again as a container 4. The blow mould is connected via a blowing air line 5 to the compressed air source 2. A device 6 is connected in the blowing air line 5 for changing a mass flow of the compressed air introduced into the blow mould. As the device 6, any element can be used which is able to switch with the speed necessary for correct performance of the blowing process, and which can change a flow cross-section of a blowing air line over a sufficiently wide range to be able to provide the different mass flows of the blowing air which are necessary to achieve a particular form of the container 4. The device 6 is preferably configured as a proportional valve, wherein a conventional proportional valve known from hydraulics is used and adapted to the purpose of changing a mass flow of compressed air. In particular, the proportional valve 6 can be changed such that the effect of positioning inaccuracies on the flowing mass flow is minimised, the through flow therefore reacts substantially less sensitively to positioning accuracy.

The proportional valve used in the device 1 is here formed as a 3/2-way directional valve and contains a housing 7 in which a valve piston 8 is axially displaceable against the force of a spring 9. The valve piston 8 is controlled by an electromagnet 10 of a control unit 11. The valve piston 8 is divided into successive different regions in the axial direction, wherein in the embodiment shown, two deflection regions 12a and 12b and two closing regions 13a and 13b alternate.

The housing 7 has inlet and/or outlet openings, wherein an inlet opening 14 is connected to the compressed air source 2 by a compressed air line 15. Furthermore, two openings 16, 17 are provided which are connected to the blow mould via the blowing air line 5. Finally, two openings 18 and 19 are provided which are connected to atmosphere via a venting line 20, preferably via a silencer 21.

Before the start of the blowing process, a development of a mass flow of the blowing air is predefined as a function of a preset sequence of the blowing process. This predefined development may then be implemented during blowing by changes in the flow cross-section of openings 14, 16, 17, 18, 19.

To this end, via the control unit 11, in the exemplary embodiment shown, the valve piston 8 of the proportional valve 6 is moved so that the second deflection chamber 12b connects the compressed air inlet opening 14 to the opening 16 to the blow mould. The openings 18 and 19 leading to the venting line 20 are closed by the adjustment regions 13a, 13b and the opening 17 is open in the first deflection chamber 12a and serves for pressure balance.

Then the valve piston 8 is shifted according to a predefined development M of the mass flow which is stored in the control unit 11, whereby the flow cross-section of the opening 16 is enlarged and reduced in the predefined manner.

Figure 5:
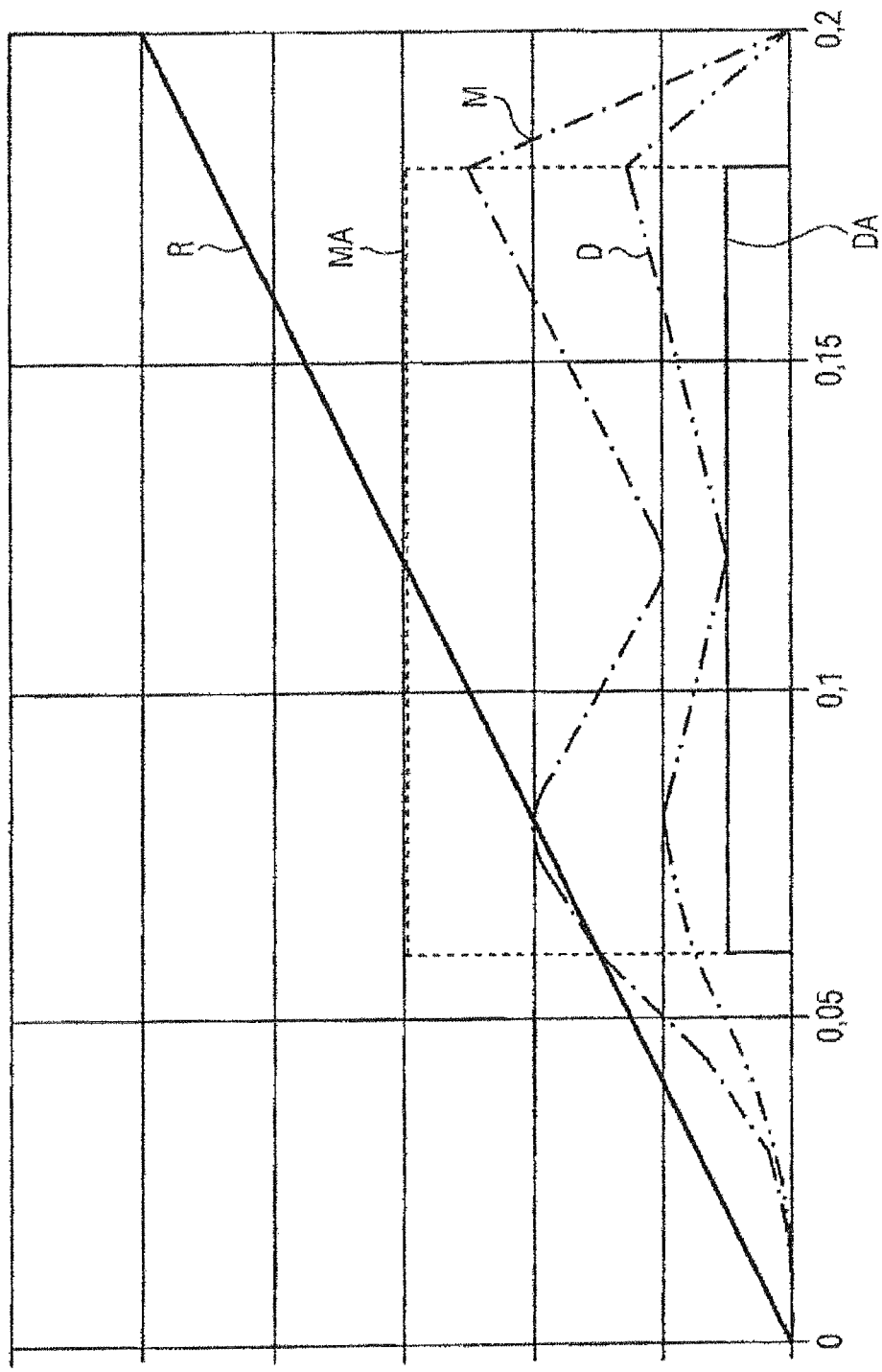

FIG. 5 shows a diagram with different curves, wherein the x-axis represents the time in seconds, and the y-axis the valve position, the mass flow and the stretch travel. This figure depicts a procedure known from the prior art.

FIG. 5 shows an example of a preferred temporal development M of the mass flow M (dotted line). Furthermore, it is evident from FIG. 5 that the course of curve of the opening positions of the flow cross-section along curve D (dashed lined curve) corresponds to the predefined temporal development of the mass flow M. First a pre-inflation process can be seen in which the flow cross-section rises up to a first maximum value, through which a first maximum value of the mass flow enters the preform. Thus a first inflation of the preform is achieved until a pressure balance results between the blowing air inside the preform/blow mould and the material response of the plastic to be stretched. Since the pressure diminishes as the material flow increases, on conventional pressure regulation an actuation response would result and the pressure would be regulated down.

For final inflation, the mass flow is brought according to curve M to a second maximum value which is higher than the maximum value on pre-inflation. Accordingly, the flow cross-section is opened more greatly than necessary for pre-inflation.

Between the pre-inflation and the final inflation, the mass flow is reduced and the flow cross-section reduced accordingly. In this way, the distribution of material in the region between the floor and the inlet opening of the container 4 can be influenced. In particular, the distribution of material between the middle of the container and the floor is balanced out.

For comparison, FIG. 5 shows a mass flow curve MA (dotted line) and the assigned valve position DA (thin continuous line) which would result if the mass flow of the blowing air was changed, not according to the invention following a predefined course, but merely by switching the compressed air supply on and off. These curves MA, DA therefore describe a further previously known process for blow moulding of containers 4.

FIG. 5 furthermore shows the percentage stretch travel from 0 to 100%, i.e. from preform to finished container, as a straight line R. FIG. 5 thus shows that by simply switching the compressed air supply on and off, with suitable adaptation of the compressed air pressure, the containers are stretched to 100% but no influence can be exerted on the development of the mass flow between 0 and 100% elongation.

As FIG. 1 shows, a device 22 can be arranged in the blowing air line 5 to the blow mould or at another suitable point, for checking the mass flow of the compressed air. This device 22, for example a conventional flowmeter, is connected to the control unit 11 and can where applicable intervene by regulation if the actual mass flow deviates from the predefined mass flow. Furthermore, quality test devices (not shown), for example measurement devices for the wall thickness, may also be connected to the control unit 11 and for example either change the predefined development M of the mass flow for all subsequent blow moulding processes, or make other changes. Furthermore, the blowing pressure can be monitored as usual and the pressure values found can be processed in a blowing curve, e.g. for documentation.

The development M of the mass flow of the blowing air, according to which the flow cross-section is changed, may however—as well as being a temporal development as shown in FIG. 5—also be defined as a development depending on certain process parameters or certain process states. Thus the development of the mass flow of the blowing air may also be predefined as a function of a specific point of a blowing wheel of a conventional blow moulding machine, so that a specific flow cross-section of the blowing air supply is assigned to each position of the blowing wheel.

On use of the proportional valve shown in FIG. 1 as a device for changing the flow cross-section, the container 4 can easily be vented after final inflation. The venting position is shown in FIG. 2. The valve piston 8 is moved into a position in which the inlet opening 14 of the compressed air line 15 from the compressed air source 2 is closed, the two openings 16, 17 are connected to the blowing air line 5 to the blow mould, and the other two openings 18, 19 are connected to the venting line 20. Each of the openings 16, 17 to the blow mould, together with an opening 18 or 19 to the venting line 20, is connected to the same deflection chamber 12a, 12b. When the valve 6 is fully opened, the double flow cross-section—compared with the blowing process in FIG. 1—is available to vent the finished container 4, so that venting can take place very quickly, which leads to a shortening of the blow moulding cycle.

As part of an advantageous embodiment, it is proposed that for purposes of recycling, blowing air from an already expanded container is returned to at least one pressure reservoir, in particular the reservoir which provides the lower pressure stage, i.e. pressure p1. This return preferably takes place via the flow cross-section change element, in particular the proportional valve. Preferably, at least at times and in particular completely during this return of blowing air into the reservoir, the volume flow is a maximum or the flow cross-section of the flow cross-section change element is at a maximum.

Figure 3:
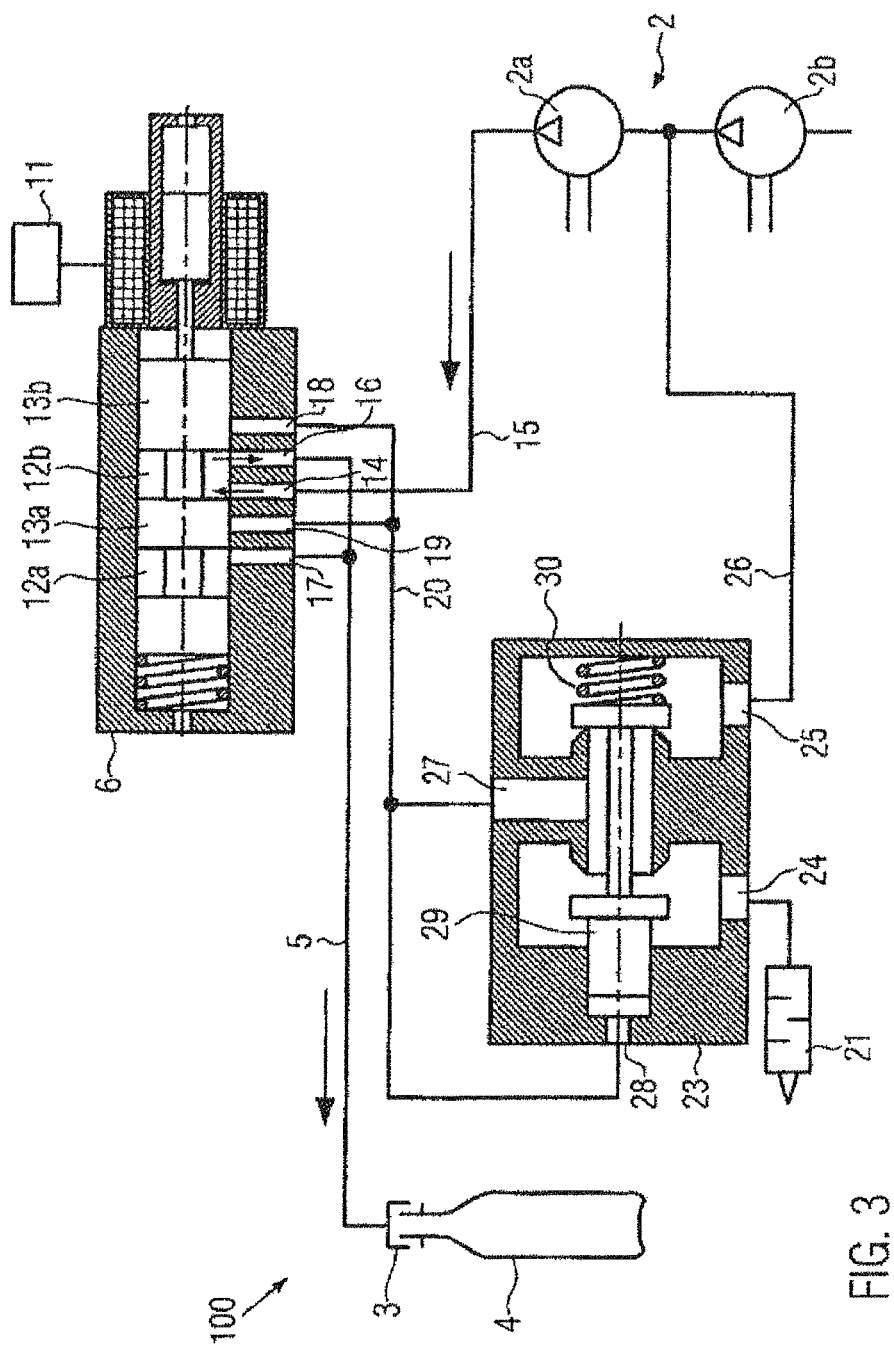
FIG. 3 shows a second exemplary embodiment of a device suitable for performance of the method according to the invention, in diagrammatic part view, on aeration of a container, FIG. 4 the device from FIG. 3 in a position for recycling the blowing air, FIG. 5 a diagram of the valve control and the predefined development of the mass flow over time, FIG. 6 a top view of a plant for production of containers, in particular plastic bottles, FIG. 7 a view of a pressure development during an expansion process, and FIG. 8 a further depiction of a device according to the invention.
Figure 4:
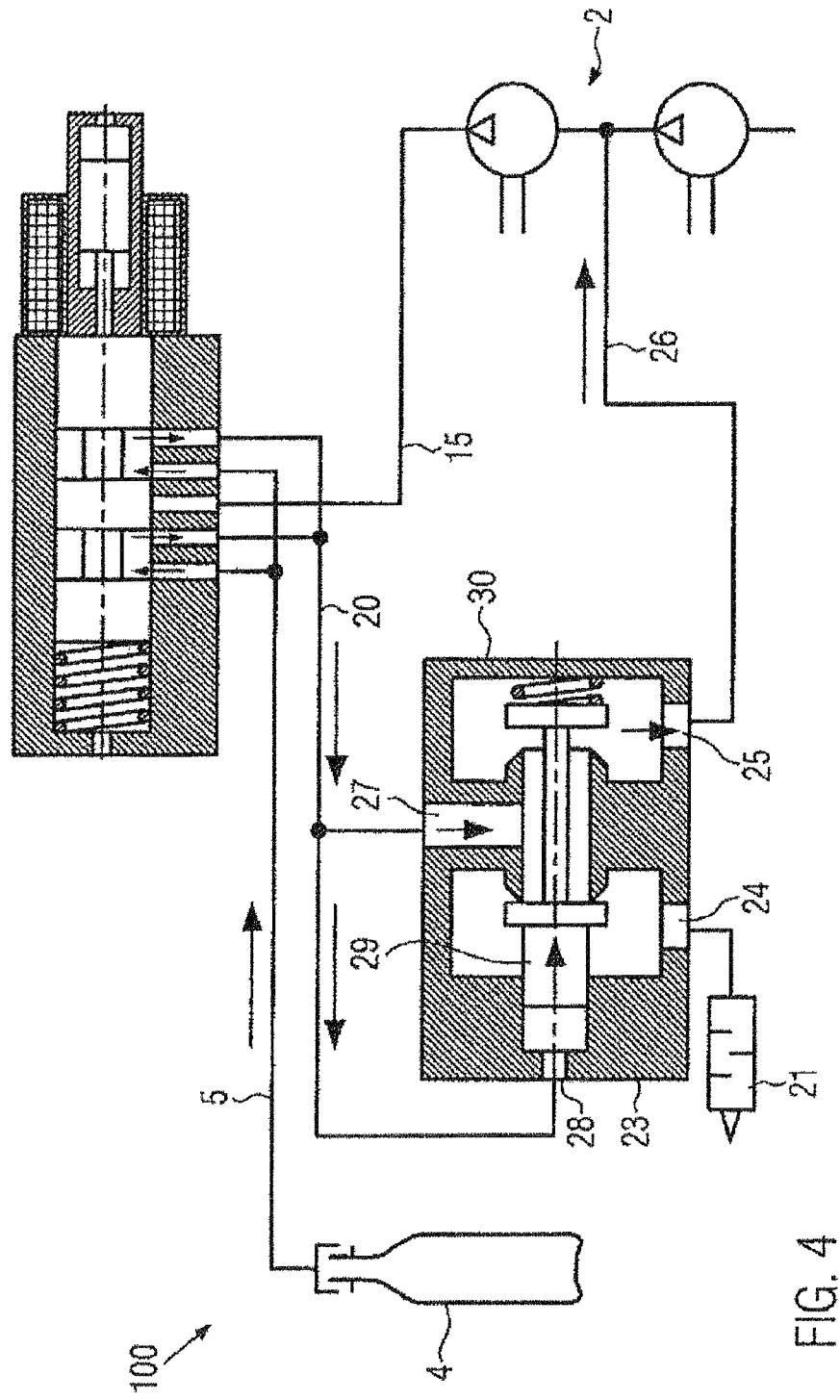

FIGS. 3 and 4 show a further exemplary embodiment of a device 100 for performance of the blow moulding method, wherein the same or comparable components are marked with the same reference numerals and not explained again. The device 100 also uses a proportional valve 6 as a device for changing the mass flow of the blowing air, wherein the proportional valve 6 of the device 100 corresponds in construction and control system to the proportional valve of the device 1.

FIG. 3 shows the blowing process. The device 100 contains a compressed air source 2 which here comprises two compressors, or two compressor stages of a compressor, 2a and 2b.

An additional venting valve 23 is connected in the venting line 20 (this situation is shown in FIG. 4). The venting valve 23 contains two outlet openings 24 and 25. The outlet opening 24 leads via the silencer 21 to atmosphere. The opening 25 leads via a recycling line 26 to the compressed air source 2, preferably between the two compressor stages 2a, 2b. The venting valve 23 furthermore has two inlet openings 27 and 28, both of which are connected to the venting line 20. The venting valve 23 contains an axially displaceable valve piston 29 which connects the inlet opening 27 with either one of the two outlet openings 24, 25. The valve piston 29 is pressurized from a face side by the venting line 20, and rests on the other face side on a spring 30. The spring 30 determines a switching pressure, and the valve piston 29 moves when this pressure is exceeded. The switching pressure is preferably 20 bar. If the pressure in the venting line 20 exceeds the spring pressure 30, i.e. the venting line 20 has sufficient pressure to justify recycling of the compressed air, the valve piston 29 is moved into a position in which the venting line 20 is connected to the recycling line 26, so the blowing air escaping from the container 4 is returned to the compressed air source 2.

If the pressure in the venting line 20 falls below the spring pressure of the spring 30, the inlet opening 27 is connected to atmosphere via the silencer 21, and the remaining blowing air is expelled.

Figure 6:
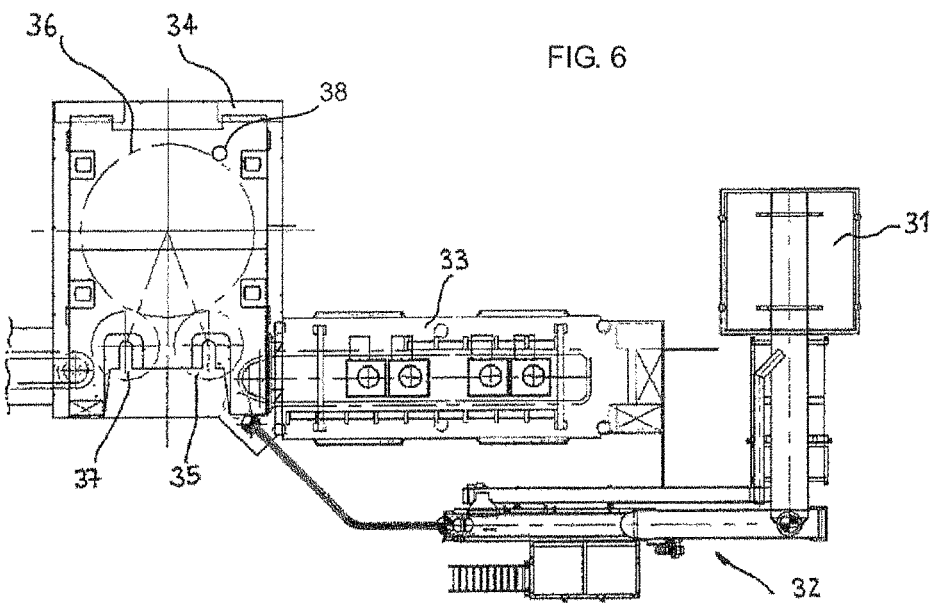

FIG. 6 shows a plant for production of containers 4, wherein the preforms are stored in a store 31, separated and aligned in a separation device 32, and supplied to a heating oven 33 for heating. In the heating oven 33, a temperature profile is imprinted on each preform which allows a defined deformation in each direction. After the heating oven 33, they are supplied via the inlet star 35 to the blowing wheel 36 on which blowing stations (not shown here) are arranged equidistantly. The blowing stations each have at least one device 6 for controlling the supply of blowing air, and usually also a stretch rod for stretching the preforms in their longitudinal axis. Reference numeral 34 indicates the forming device as a whole.

The blowing wheel 36 thus constitutes the above-mentioned transport device for transporting the plastic preforms or plastic containers. Reference numeral 38 indicates diagrammatically a forming station arranged on the blowing wheel. Thus the forming stations 38 are guided here along a substantially circular path.

Preferably, each blowing station is configured to perform the method according to the invention. Alternatively, the blowing stations may have several devices 6 which distribute/control the air during production of the containers. Thus e.g. a second device 6 may be present in each blowing station to control the air recovery from the bottle. The finished containers 4 are transferred from the blowing wheel 36 to the following machines by means of an outlet star 37.

By derivation from the exemplary embodiments described and shown, instead of the proportional valve 6, any other suitable device may be used for changing the flow cross-section for the blowing air. If, using the method according to the invention, foodstuff containers are produced such as e.g. drinks bottles or similar, oil-free valves which are otherwise harmless under foodstuff legislation or similar may also be used.

Figure 7:
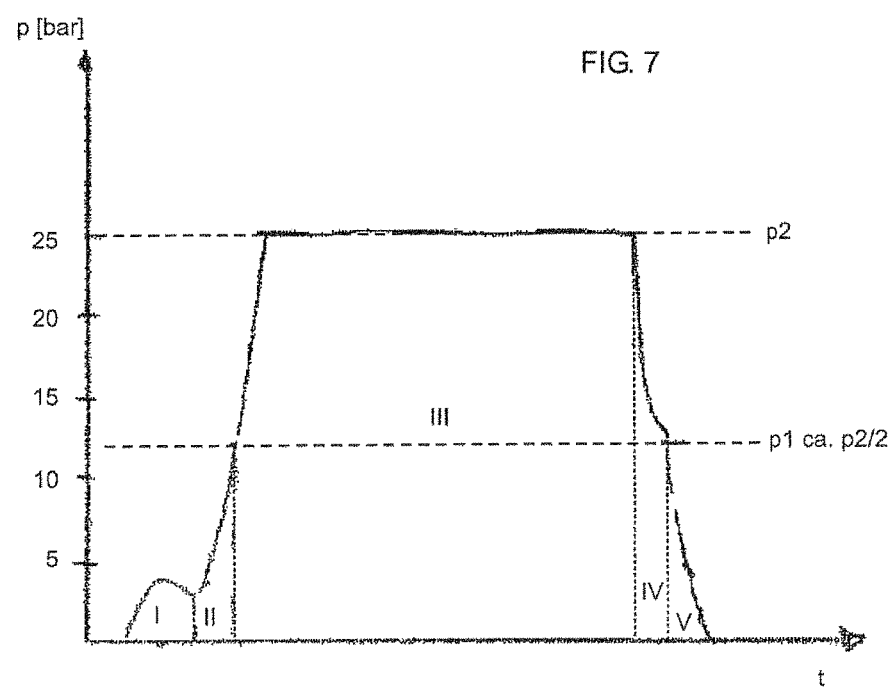

FIG. 7 shows a depiction of a pressure curve for a method according to the invention. The x-axis represents the time, and the y-axis the pressure. The dotted horizontal lines indicate the two pressure levels p1 and p2. In the situation shown in FIG. 7, the pressure p1 is around half as great as the pressure p2.

In the first process step I, the plastic preform is pre-inflated. In this method step, by adjusting the cross-section of the p1 valve (which may in particular be a proportional valve of the type described above), and in particular instead of changing the p1 pressure, a material distribution of the plastic preform to be expanded is optimised. As stated, this pressure p1 is around half the pressure p2.

In method step II, an extended pre-inflation now takes place instead of the intermediate inflation normally performed in the prior art. In this method portion, the flow cross-section of the proportional valve is fully open to optimise the process angle.

In method step III, the final inflation of the container takes place at a higher pressure p2. The valve which supplies the blowing air under pressure p1 is closed.

In method step IV, the blowing air is recycled. After forming the container, blowing air is returned to the reservoir with pressure p1. This supply advantageously also takes place via the flow cross-section change device, i.e. in particular the proportional valve. Preferably, at least at times and preferably continuously during this method step IV, the maximum flow cross-section or maximum volume flow is set in order thus to minimise the recycling duration. In method step V, the load on the container is relieved.

Figure 8:
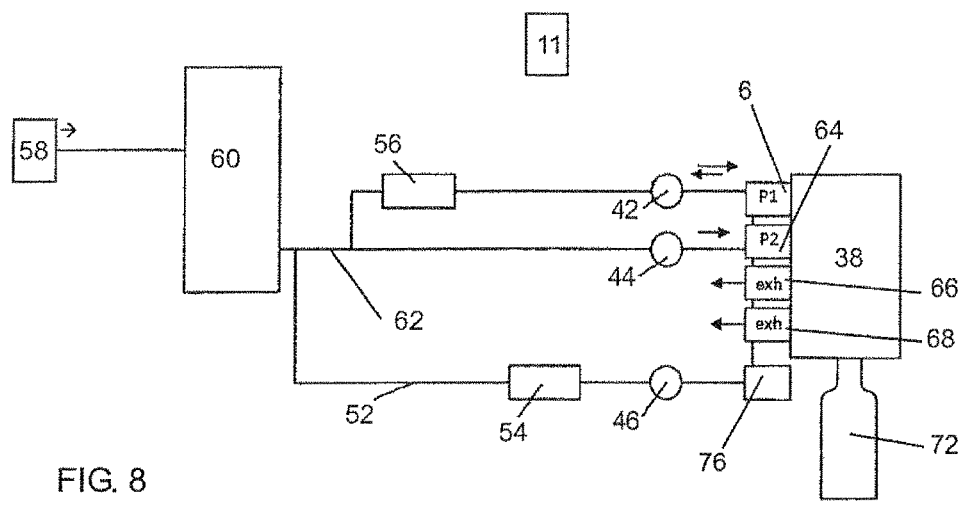

FIG. 8 shows a diagrammatic depiction of a device according to the invention. A preparation unit 58 is provided for preparing the compressed air or process air. This preparation unit 58, which may be a compressor for example, is advantageously arranged stationarily. Reference numeral 60 relates to a distribution device which distributes the process air to the individual forming stations. This distribution device is preferably configured as a rotary distributor.

The compressed air thus distributed to the forming stations 38 is supplied firstly to a control air line 52 and secondly to a process air line 62. Starting from this process air line 62, the compressed air is again divided into a first compressed air reservoir 42 and a second compressed air reservoir 44. These compressed air reservoirs are preferably ring channels which are arranged on the rotating part of the device.

Reference numeral 6 here relates again to a first valve device, here configured as a proportional valve, which controls the supply of compressed air with pressure level p1 to the plastic container 72. Reference numeral 64 designates a second valve device which controls the compressed air supply for compressed air with the second pressure p2 to the container. Reference numeral 56 designates a pressure regulator device which regulates the pressure p1.

The air in the control line is supplied via a pressure regulator device 54 to a further compressed air reservoir 46, also configured as a ring channel. The reference numerals 66 and 68 relate to outlet or exhaust valves. Reference numeral 11 designates a control device (only shown highly diagrammatically) which controls the supply of compressed air to the plastic containers. In addition, one or more measuring devices may be provided for measuring a volume or mass flow.

The applicant reserves the right to claim all features disclosed in the application documents as essential to the invention where novel individually or in combination in relation to the prior art. It is furthermore pointed out that in the individual figures, features are described which in themselves may be advantageous. The person skilled in the art will immediately gather that a specific feature described in one figure may also be advantageous even without the use of further features from this figure. Furthermore, the person skilled in the art will know that advantages may result from a combination of several features shown individually or in different figures. Thus for example the proportional valve described in FIG. 1 may be used for the device shown in FIG. 8.

The invention claimed is:

1. A method for forming plastic preforms into plastic bottles, wherein the plastic preforms are transported along a predefined transport path by a transport device in a plurality of forming stations arranged on the transport device, and at least at times during this transport, undergo expansion by being bombarded with a fluid medium for their expansion, wherein the plastic preforms in a first method step are bombarded by the fluid medium at a first pressure (p1) and in a further method step, temporally following the first method step, bombarded with the fluid medium at a second pressure (p2), wherein the second pressure (p2) is higher than the first pressure (p1), wherein
   at least at times during bombardment of the plastic preforms at the first pressure (p1), a volume flow of the fluid medium entering the container is changed, and
   wherein during expansion no additional bombardment with a fluid medium occurs so that there is no need to provide a further pressure level for intermediate inflation, but merely a pre-inflation or bombardment at first pressure (p1), and wherein during expansion a flow cross-section is changed and is increased, so that during or after the pre-inflation, the cross-section of a valve is opened and the second pressure (p2) is applied to the plastic perform or container.

2. The method according to claim 1, wherein
   the first pressure (p1) and the second pressure (p2) have a ratio to each other of between 1:3 and 2:3.

3. The method according to claim 1, wherein
   the valve for changing volume flow is a proportional valve.

4. The method according to claim 1, wherein
   the plastic preforms are bombarded at a first pressure (p1) during a first time period (t1) and at a second pressure (p2) during a second time period (t2), and the time periods have a ratio to each other of between 1:2 and 1:20.

5. The method according to claim 1, wherein
   the fluid medium at the first pressure (p1) is provided by a first pressure reservoir and at least at times, the fluid medium is supplied to the first pressure reservoir from at least one forming station.

6. The method according to claim 1, wherein
   the supply of fluid medium to the plastic preforms is controlled as a function of a peripheral position of the forming stations.

7. The method according to claim 1, wherein the change in the volume flow of the fluid medium entering the container is to increase the volume flow.

8. The method according to claim 1, wherein for the purposes of recycling, blowing air from an already expanded container is returned at least in part to at least one pressure reservoir which provides the lower pressure (p1), wherein the blowing air return takes place via a flow cross-section change element.

9. The method according to claim 8, wherein at least at times during the return of blowing air into the reservoir, the volume flow is a maximum or the flow cross-section of the flow cross-section change element is at a maximum.

\* \* \* \* \*